United States Patent [19]
Northrop

[11] Patent Number: 5,755,852
[45] Date of Patent: May 26, 1998

[54] BIOCONVERTED NUTRIENT RICH HUMUS

[75] Inventor: Jere Northrop, North Tonawanda, N.Y.

[73] Assignee: Bion Technologies, Inc., Amherst, N.Y.

[21] Appl. No.: 687,016

[22] Filed: Jul. 16, 1996

Related U.S. Application Data

[63] Continuation-in-part of Ser. No. 293,545, Aug. 22, 1994, Pat. No. 5,538,529, which is a continuation-in-part of Ser. No. 120,164, Sep. 10, 1993, Pat. No. 5,472,472.

[51] Int. Cl.⁶ ........................... C05F 3/00
[52] U.S. Cl. ............... 71/9; 71/10; 71/13; 71/15; 71/24; 426/807; 210/602; 210/607
[58] Field of Search .................. 71/8–10, 13, 15, 71/24; 210/602, 607, 616, 618, 673; 426/807

[56] References Cited

U.S. PATENT DOCUMENTS

| | | | |
|---|---|---|---|
| 4,137,158 | 1/1979 | Ishida | 210/16 |
| 4,772,307 | 9/1988 | Kiss et al. | 71/13 |
| 5,078,882 | 1/1992 | Northrop | 71/9 |
| 5,472,472 | 12/1995 | Northrop | 71/9 |
| 5,538,529 | 7/1996 | Northrop | 71/9 |

Primary Examiner—Ferris Lander
Attorney, Agent, or Firm—Crossetta & Associates

[57] ABSTRACT

The invention relates to a nutrient rich humus material produced by a process wherein solids in an aqueous slurry of animal excrement are settled or precipitated in a solids ecoreactor, the slurry may be treated before and/or after settlement in the ecoreactor by passing to a bioreactor wherein soluble phosphorus may be precipitated with metallic salts, the slurry is aerobically and anaerobically treated to form an active biomass that actively bioconverts remaining soluble phosphorus, nitrogen and organics, and the aqueous slurry containing bioconverted phosphorus is recycled to said solids ecoreactor and/or discharged, and at least a portion of slurry is bioconverted and recovered as a beneficial humus material.

14 Claims, 2 Drawing Sheets ions of toxic materials. Concentrations of toxic materials, which may have been used as insecticides or herbicides, including metals and the like, may be typically part of the animal food intake and though not generally harmful to the animal or the animal product being farmed, end up in the animal excrement which is distributed to the field and eventually become concentrated in the field, permeate the soil and are carried to surface waters and fresh water aquifers by rain water and the like. Thus, the toxic materials are eventually carried along with phosphorus, nitrogen and metals to local surface waters and fresh water aquifers and the like spreading through the local environment and further destabilizing the local ecosystem.

BIOCONVERTED NUTRIENT RICH HUMUS

This application is a CIP of U.S. Ser. No. 08/293,545, filed Sep. 22, 1994 now U.S. Pat. No. 5,538,529, which is a CIP of U.S. Ser. No. 08/120,164, filed Sep. 10, 1993, now U.S. Pat. No. 5,472,472.

The invention relates to a novel nutrient rich humus produced by an improved process for the biological transformation of animal wastes into ecologically manageable materials.

BACKGROUND OF THE INVENTION

The handling of waste excrement generated through animal farming has been a persistent problem. Traditionally, waste excrement has been used as a crop fertilizer. The traditional farmer gathers concentrations of excrement waste from animal barns, feeding stations and the like and typically spreads such on fields used for growing food for the animals to consume. Thus, in the traditional sense of ecologically balanced animal farming, animal waste excrement is allowed to decay in the field, various elements of the decay such as unstable phosphorus and nitrogenous products may be taken up by growing crop plants and the crop plants are harvested for food to be eaten by the animals in an efficient recycle of elements which occurs over and over again to the benefit of all and perceived detriment of none.

Modern animal farming practices, particularly modern feedlot and dairy farming practices, have detrimentally affected the ecological balance of traditional animal farming. The efficiencies of animal farming have changed and modern techniques concentrate larger numbers of animals in smaller areas leaving larger amounts of waste excrement to be managed by distribution to smaller land areas. The larger amounts of food required by the larger number of animals and intense feeding practices of modern animal farming using supplemental cattle feed containing concentrations of phosphorus and nitrogen, produces larger amounts of manure which contain phosphorus and nitrogen levels which cannot be assimilated by traditional field farming methods. Fields on which such manure has been spread become rich in unstabilized phosphorus, nitrogen and potassium, beyond what is appropriate to sustain flourishing field plant life, creating a pollution hazard to ground and surface water and repugnant odor problems.

Rain, falling on the phosphorus and nitrogen rich soil carry unstabilized nitrogen, phosphorus and other elements garnered from the waste excrement from the soil. With the flow of water through drainage ditches, groundwater currents and the like eventually, fresh water aquifers and other fresh water sources are found to be at hazardously high phosphorus, potassium and nitrogen levels creating environmental problems.

The problem of fresh water pollution by phosphorus and nitrogen content may be exacerbated by an accompanying concentration of toxic materials. Concentrat Various solutions have been proposed to solve the ecological problem posed by modern animal farming, but have been judged to be incomplete or so specialized that they only serve to change or postpone the problem.

For example, it has been proposed to isolate manure in depositories secure from rain water run-off until the decaying process has produced a concentrated desirable humus which then can be commercially sold or otherwise distributed to non-impacted localities. Such proposal presents intense odor problems, requires constant manpower to accomplish and significant construction to resolve the migration problem caused by rain washing on exposed manure containing unstabilized phosphorus, nitrogen and potassium.

The present invention addresses the problems associated with animal waste excrement handling by providing a means to resolve ecological problems associated with the local migration of unstabilized phosphorus and nitrogen, through the efficient bioconversion of waste excrement materials into a stable, economically and/or ecologically beneficial humus material.

Thus, it is an object of the invention to provide an ecologically suitable means for managing animal waste excrement.

It is another object to provide an improved process for the biological transformation of animal wastes, toxins or other waste materials into economically suitable materials.

It is a further object of the present invention to provide a biologically active, and/or a nutrient-rich, organic humus from animal waste excrement.

These and other objects will be apparent from the following description of the invention.

SUMMARY OF THE INVENTION

The present invention utilizes an animal waste excrement bioconversion process, known as BIONSOIL NMS™, to produce a humus known as BIONSOIL™, both trademarks of Bion Technologies Inc. The bioconversion process biologically transforms animal waste excrement, containing significant concentrations of soluble phosphorus and nitrogen materials and other organic biodegradable materials as measured by biochemical oxygen demand (BOD), into an ecologically stable nutrient rich organic humus. The humus has economic commercial value, is of pleasant odor and can safely be maintained in open storage without significant migration of nitrogen and phosphorus values. The process also manages water which may have been combined with animal waste excrement to provide a nutrient rich aqueous fertilizer and/or a clean, generally low nutrient water discharge, which can be used to irrigate a crop.

The bioconversion process of the invention comprises treatment of the animal wastes in two primary systems or zones: a dynamic solids bioconversion ecoreactor; and, one or more organism managing bioreactors. Liquid effluent from the organism managing bioreactor(s) can be further treated by an effluent polishing ecoreactor and/or can be collected for recycle and/or direct application to crop growing fields as a nutrient rich aqueous fertilizer.

In the process of the invention, wash and flushing water containing slurried animal excrement wastes from an animal confining barn, penning area or the like, is directed to an organism growth managing and enhancing bioreactor and/or a dynamic solids ecoreactor which generally functions as a multi-zone composting, solids dewatering and bioconversion means. Liquid effluent from the solids ecoreactor is treated by an organism managing bioreactor wherein organisms contained in the effluent are enhanced, modified and/or concentrated. Treated bioreactor effluent is recycled back to the animal confining barn, penning area or the like for flushing the slurried animal wastes, and/or to the dynamic solids ecoreactor to augment the bioconversion processing of such ecoreactor. Provision is also made for discharge of treated bioreactor effluent to a polishing ecoreactor and/or for recycle as an aqueous fluid source for washing or flushing the barn, penning area or the like and/or for recovery for use as a nutrient rich aqueous fertilizer for appropriate application to plant growing.

Generally, a solids ecoreactor of the process of the invention comprises a plurality of holding cells or zones, surrounded by containment berms. In a preferred embodiment a plurality of cells are arranged so that individual or sets of cells may be periodically interrupted from the process so that their contents may be dried, harvested for bioconverted organic humus and eventually reactivated within the bioconverting process. In another embodiment, a plurality of cells are arranged for interruptible sequential flow of fluid therethrough. In a still further arrangement, influent is directed from the barn, penning area or the like to a selected first cell(s) and sequentially to one or more other cell(s) and so forth, in an arrangement wherein flow to a cell can be interrupted for temporary or permanent removal from the sequential arrangement and wherein a first cell can be an other cell or vice-versa.

Generally a cell is configured so the slurried waste flows slowly from an influent end of the cell to an effluent end, with waste excrement solids being allowed to settle and precipitate and become trapped within a cell for gradual transformation, through bioconversion, into a nutrient-rich, organic humus. Portions of the effluent from an effluent end or other portion of a cell or zone of the solids ecoreactor may be recycled back to the influent end or other portion of the cell or zone, to the influent end or other portion of another cell or zone of the solids ecoreactor, to an organism managing bioreactor, or can be used as an aqueous source to flush the barns, lanes or pen areas containing the confined animals.

The organism managing bioreactor(s) is distinct from the solids ecoreactor and generally comprises a suitably sized pond environment or the like, which contains one or more inlets for receiving flushed animal waste and/or liquid effluent from one or more of the plurality of zones or cells of a solids ecoreactor and one or more outlets for discharging treated effluent to a solids ecoreactor cell and/or to a polishing ecoreactor, for recovery of nutrient rich aqueous fertilizer and/or for recycle of an organism enhanced aqueous fluid to one or more cells of the solids ecoreactor.

The bioreactor(s) contains a diverse microbial biomass with anaerobic, aerobic and facultative bacterial populations generally concentrated in corresponding zones with an anaerobic zone generally arranged close to an inlet and occasionally an aerobic zone generally arranged close to an outlet.

An aerator may be positioned in one or more bioreactor to enhance formation of aerobic and facultative microbial populations. Anaerobically stressed organisms are received in aqueous flow from the flushed animal manure and recycled liquids from the solids ecoreactor and concentrated biologically active organisms are recycled from a bioreactor to the solids ecoreactor and/or to a polishing ecoreactor.

The general nature of animal waste excrement flowing directly to the solids ecoreactor from the animal holding area is such that generally, when left to its own evolution, the biological environment of the aqueous component of the solids ecoreactor tends to become anaerobic and the organism population appears to become so inactive in nutrient assimilation, capture and precipitation as to compromise the biological benefit of the product. An organism managing bioreactor(s) is arranged to receive flushed animal manures or anaerobic aqueous effluent from the solids ecoreactor and to produce therefrom a treated aqueous effluent, containing a multitude of active, naturally occurring bacterial species especially predisposed to nutrient capture and assimilation. The recycle or discharge of the treated aqueous effluent of a bioreactor to the solids ecoreactor provides continually evolving enhanced organism species for interaction with the anaerobic organism population of the solids ecoreactor and further enhances the formation of an aerobic and/or facultative organism population which is predisposed to nutrient capture and assimilation. Thus, the interaction between a managing bioreactor(s) and a solids ecoreactor and/or a polishing ecoreactor is one wherein aerobic and/or facultative organisms which successfully assimilate and capture nutrients in the bioconversion in the ecoreactor are enhanced, grown, concentrated and returned to the ecoreactor.

The polishing ecoreactor generally constitutes a flooded vegetative complex and preferably comprises a wetlands environment made up of plants and microorganisms adequate to capture the nutrients contained in the effluent discharged from a bioreactor. In a preferred embodiment, the polishing ecoreactor generally comprises multiple, distinct polishing ecoreactor cells arranged such that liquid discharged from a bioreactor can be directed thereto in a variable and controlled manner. An especially preferred polishing ecoreactor generally comprises a suitable low lying field with a berm perimeter and cross berms which create two or more liquid holding cells, wherein effluent from a bioreactor zone can be variably directed to one or more cells of the polishing ecoreactor.

In the process of the invention, the solids ecoreactor and the bioreactor(s) comprise secondary subsystems which are cyclically connected by a series of recycle flows and organism movements to bioconvert materials contained therein.

The bioconverted materials comprising the liquid effluent from the solids ecoreactor of the process are ecologically beneficial products in that they comprise entrained nitrogen, phosphorus and potassium, and thus can be recovered for use outside the process. However, generally it is more economically desirable to cycle solids ecoreactor effluent to a bioreactor to enhance the activity of the organisms contained therein, or, to recycle such effluent to wash or flush the animal barn, penning areas and the like.

The bioconverted materials comprising the liquid effluent from a bioreactor of the process are also desirable and ecologically beneficial products comprising entrained nitrogen, phosphorus and potassium. Generally, it is economically desirable to collect liquid effluent from a bioreactor for use in suitable liquid fertilizing applications.

Generally, water effluent from a polishing ecoreactor is sufficiently pollutant free to allow discharge thereof into a natural receiving water. Generally, it is economically desirable to utilize water effluent from the polishing ecoreactor for irrigation or the like purposes.

A chemical addition/mixing subzone may be associated with a bioreactor or may be positioned in one or more cells of a solids ecoreactor. Such subzone is positioned for mixing metallic salts for the removal of precipitable phosphorus and preferably is positioned at about the influent end of the bioreactor. Preferred metallic salts for treating the influent include ferrous sulfate, ferric chloride, alum and the like which can combine with suspended and/or solubilized phosphorus compounds to form a precipitate and/or associated chemical complexes.

The nutrient rich humus of the invention is a settled and precipitated, micro-organism active, by-product of the solids ecoreactor. The humus comprises bioconverted animal waste excrement containing stable nitrogen, phosphorus and potassium rich material, bound in an active micro-organism matrix intermixed with fibrous cellulosic and/or other organic materials. The appearance of dried humus varies significantly from dried manure in that it is a deep brown, fibrous peatlike or granular material, which readily mixes with soil, including clay, sand and the like. The material is generally absent an offensive manure odor and smells closely similar to that of a rich topsoil. The material is comminuted and generally comprises few clumps. The material is generally hydrophobic in that it resists wetting, but, once wetted it becomes hydrophilic in that it tends to hold water. The material appears to resist clumping even when wetted.

The humus of the invention is nutrient rich, comprising from about 0.2 to about 6.0% nitrogen, about 0.1 to about 2.0% phosphorus and from about 0.1 to about 2.0% potassium on a dry weight basis, in stable form. Nitrogen, in the form of ammonia, is generally at 3% or less of total nitrogen and quantities of calcium, manganese, magnesium, iron and sulfur are generally present. Though unstable nitrogen and phosphorus values are generally present in the humus of the invention, they appear to be in quantities so low as to constitute little or no environmental threat through aqueous dissolution and run-off. Thus, the humus of the invention is unique in that the nitrogen and phosphorus nutrient rich character thereof is in a form beneficial for enhancing the growth of vegetation within its environment, yet resistant to migration by rainfall, ground water flow and the like to pollution of aquifer, surface and groundwater accumulations.

The humus of the invention generally comprises other components, which are defined by the animal feed supply, the animal from which the humus is generated, and any bedding, parlor washwaters, cleaners, run-off and the like other materials which may be collected or added to the system for humus generation. Such other components and additions appear to cooperate to distinguish the efficacy of a particular humus of the invention for a particular use.

Thus, waste may be collected from any convenient animal waste source such as dairy cows, sheep, goats and the like, feed lot cattle, swine, horses, zoo animals, poultry including chicken, turkeys, ducks and the like and even aquatic animals such as fish, frogs and alligators.

The organic matrix of the humus of the invention is rich in stabilized nutrient content and comprises dynamic macro and/or micro organisms and other components which appear especially predisposed to proactively adapt and interact with additive materials in an efficacious phenomena which can be managed to provide a host of further beneficial products.

The management of the system is organized to maximize the active, facultative biomass by continually generating genetic variations in its organisms to optimize microbial adaptability of the biomass to survive and thrive in varying environments and the humus which is harvested from the system has an active microbial potential which appears to adapt to environmental changes with a host of interesting beneficial effects.

Thus, the humus of the invention which comprises captured and stabilized nutrients along with trace metals appears to adapt to capture toxic substrates or radioactive materials or trace metals when mixed with a sludge material containing same. Microbial variations which appear in the system to degrade cellulose and lignin are enhanced by microbial variations which appear to degrade plastics, and microbial variations which appear in the system as capturing and stabilizing nutrients are enhanced by microbial variations which appear to promote seed germination and release of nutrients which increase crop yield and size of fruits, grains and vegetables.

The humus of the invention is generally processed after harvesting for both convenience of handling and enhancement of microbial activity. Generally, the humus of the invention is at least partially dried to reduce its handling weight by air drying, vacuum water removal, mild heat drying or the like and thereafter shredded, screened, pulverized or the like as may be desired. It should be understood however, the humus of the invention need not be dried or further comminuted to be effective as a beneficial product in accord with the invention.

Partially dried and comminuted humus is easily mixed with other materials and has been found to be especially effective in providing an enhanced growth media when mixed with normal soils and top soils. When mixing the humus with normal soils it is preferred to use not more than about 1:2 parts by volume humus:soil and generally adequate nutrition content will be imparted to a soil at levels of about 1:3–7 parts by volume humus:soil. Generally when mixing with top soils the amount of humus can be reduced to about 1:4–12 parts by volume humus:topsoil.

The humus of the invention can also be effective in producing remediated growth soil media when mixed with clay, sand, silt, mud, soil, gravel, dust, mine tailings, dredge materials, depleted or spent soils and the like. New growth media can be created through mixtures of the humus with sawdust, paper, cardboard, polymers, plastics, waste organics or agricultural materials such as bagasse, hulls, stalks, stems, waste hay, leaves, shells, cotton or rayon dust and the like.

It is contemplated that the humus of the invention can also be used in aquatic growth environments wherein the humus alone or mixed as above indicated with other media is comprised in a flooded environment for plant growth. Aqueous nutrient containing liquid from the aforesaid flooded humus environment, or from an ecoreactor or bioreactor of the system, may be directed to a hydroponic system, with or without recycle to a humus containing flooded environment, ecoreactor, bioreactor or the like to enable a convenient source of plant growth nutrients.

Though the humus of the invention provides enhanced nutrient content to promote germination and growth of plants, it has also been found to be effective in suppressing plant disease and providing plant pest resistance. Humus which is harvested direct from the system of the invention is generally too nutrient rich to be a suitable plant growth media standing alone, and is generally mixed with an appropriate material as above described to provide a desirable medium. Interestingly however, such directly harvested humus appears to provide a good top cover for plants which have been seeded or germinated in under soils, appearing to provide resistance from volunteer growth of airborne seeds and/or appear to be resistant to the spread of disease bacteria and the like while providing a rich nutrient source which can be utilized by the root structure of the existing plant.

The humus of the invention can also be an effective feed component. Depending upon the animal source of the waste used to generate the humus of the invention, the humus can be of beneficial utility as a feed stock and/or additive. For example, the waste from typical swine feed lot operations generally comprises protein content which appears to define and characterize the humus generated by such system of the invention as being a delivery vehicle for nutrients, trace elements and the like for feed stock utility.

Thus, humus generated from barn and manure waste from a trough fed dairy cow operation comprises an active organic matrix which may be characterized differently from that of a grazing fed dairy cow operation, which is different from a hog feed lot operation and/or chicken or turkey lot operation. Though each such operation produces a nutrient rich humus which has general applicability for plant growth, each operation also results in a humus containing other components which generally contribute to a particular humus being particularly suitable for specific utilities such as enhanced germination and growth of specific plants and/or remediation of specific soils and/or characterization as foodstuffs or feed additives. The humus of the invention can be modified to achieve specific objectives by introducing various materials into the influent flush waters to the process or into various other of the bioreactor or ecoreactor or other components of the process. The nature of the added material and the manner and location of its addition will influence the adaptive and biodynamic character of the process and the resulting humus or other byproduct material. This can be managed to achieve a variety of desirable endproduct uses and functions.

DETAILED DISCLOSURE OF THE INVENTION

The novel process of the invention involves bioconversion of animal wastes into an economically desirable humus material. The process utilizes a combination of chemical precipitation, physical settling and natural living systems such as microbes and plants to achieve bioconversion of the animal waste and exploits the creative capability of living organisms to adapt to achieve the bioconversion of nitrogen and phosphorus containing materials.

The two primary zones, e.g. solids ecoreactor and bioreactor(s), function as a part of an integrated, multiple recycling input/output flow through system, with optional removal of precipitable phosphorus at desired locations being mediated by a chemical addition subsystem.

The process functions under the overall guidance of complementary, operational control strategies. One control strategy comprises imposing general biological control, based on extension of the maximum entropy principle, to optimize the system. Such strategy emphasizes the moderation of dynamic environmental extremes, the maintenance of suitable nutritional balances, and the artificial alteration of physical, chemical and biological sub-environments. Another control strategy comprises controlling the communication/ transport of fluids so as to optimize the covariance of all information, material and chemical exchanges among various components of the system as a whole.

Figure 1:
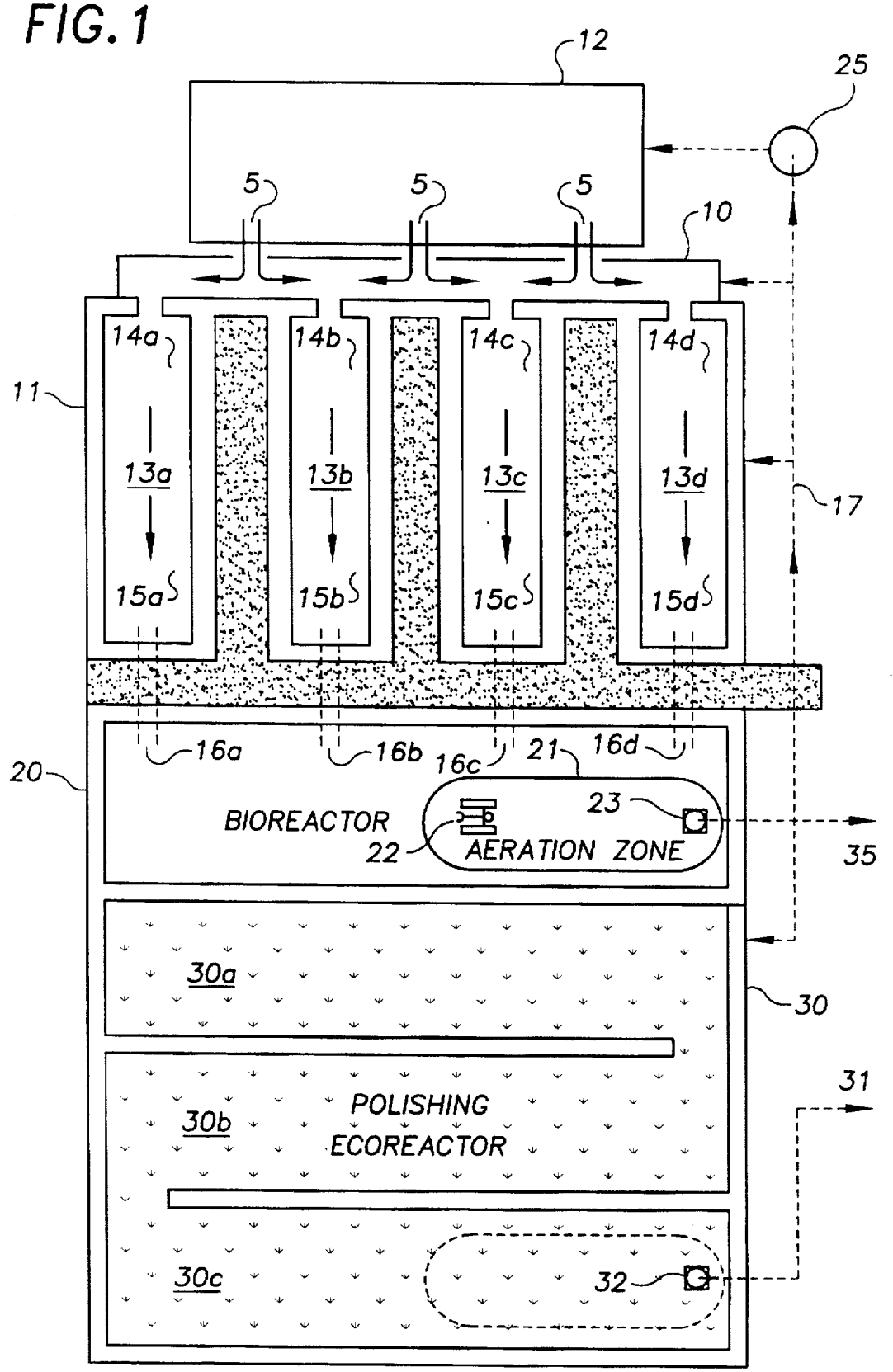
FIG. 1 comprises a flow diagram of an embodiment of the process of the invention with a secondary bioreactor and a solids ecoreactor.

Referring now to FIG. 1. Therein, an aqueous manure influent 5, containing high quantities of phosphorus and nitrogen, bedding materials and the like, is introduced into a flow distribution channel 10 of a solids ecoreactor 11 from a confined animal area 12 such as a barn, penning area or the like.

Four, generally rectangular solids ecoreactor cells 13a–d are adjacently arranged in the ecoreactor to receive the manure influent from the flow distribution channel in such manner that flow may be diverted to one or another cell(s) to facilitate cyclical drying and recovery of solids within a cell.

Though a solids ecoreactor may be configured in a variety of shapes, preferably it is shaped as a rectangular structure having an influent end adjacent the collection area and an effluent end generally opposite thereto. A solids ecoreactor is generally divided into a number of cells separated by low berms which tend to resist the flow of solids from cell to cell. In one configuration a rectangular shaped ecoreactor is divided into a plurality of triangular shaped cells. In the preferred configuration, as illustrated in FIG. 1, the ecoreactor is divided into a plurality of elongate rectangular cells which are spaced apart with a bioreactor spaced adjacent thereto. The spaced arrangement of the elongated cells is sufficient to provide vehicle access between the cells and between the bioreactor and the cells. Such arrangement is particularly convenient for harvesting the cells in that it provides access for equipment for mounding humus in a cell and collecting the cured humus from a cell without interruption of the bioconverting process in adjacent cells.

The floor of a solids ecoreactor, or, of an individual cell comprising the ecoreactor, is generally graded from an influent end 14a–d to an effluent end 15a–d to facilitate gravity water drainage from a cell. In one embodiment an underground drainage system comprising a layer of porous material, e.g. sand or gravel, is constructed under the floor of the cells and piping 16a–d is arranged to facilitate distribution of aqueous effluent from the individual cells to the bioreactor 20. A synthetic or earthen liner is preferably utilized in the solids ecoreactor and bioreactor to prevent groundwater contamination.

Aqueous effluent is generally recycled through line 17, back to a recycle water flushing tank 25 for recycle to the animal confining area 12, to flow distribution channel 10, and/or may be directly recycled to a cell of the solids ecoreactor.

Bioreactor 20 is illustrated as comprising zones of dominating anaerobic organisms around inlets to the bioreactor of piping 16a–d from solids ecoreactor cells, and a dominating aerobic zone 21 formed about aerator 22. Pump means 23 is positioned in a dominating aerobic zone for moving recycle effluent to flushing tank 25 and/or polishing ecoreactor 30 and/or for recovery 35 as a nutrient rich aqueous fertilizer.

A bioreactor generally comprises multiple diverse sub-environments, including aerobic zones, anoxic and/or anaerobic zones, facultative bacteria zones, mixing zones, quiescent zones and settling zones, and it usually comprises one or more recycles among the various zones. Suitable bioreactors generally comprise a pond or the like having a suitable lining of artificial or natural materials that generally resist the flow of fluids therethrough and maintain the integrity of the bioreactor.

Preferably the bioreactor is configured to maintain at least a minimal flow and may comprise an agitating means or the like and/or an aeration means. The bioreactor is designed to contain both aerobic and anaerobic subzones and no attempt is made to achieve effluent clarity from the bioreactor zone. as excess nutrient or other contaminants which may be generated are typically recycled back through the solids ecoreactor, discharged to a polishing ecoreactor or collected for use as a nutrient rich aqueous fertilizer in the process of the invention.

The polishing ecoreactor generally takes the form of a series of constructed wetland cells containing a wide variety of microorganisms, plants and animals. Generally, the plant environment comprises wetland plants indigenous to the area in which it is constructed, and the microorganisms that predominate are generated in the bioreactor and are the products of survival and growth therein. The polishing ecoreactor zone may be contained in a greenhouse like structure but typically is exposed to the weather and open to the natural environment. The principle function of the polishing ecoreactor is the bioconversion and biofiltration of wastewater discharged from the bioreactor, which results in the production of an ecologically beneficial low nutrient water.

In FIG. 1, polishing ecoreactor 30 comprises cells 30a–c arranged for sequential flow of fluid therethrough. Sump 32 is provided for pumping low nutrient water 31 from cell 30c for irrigation or the like.

Figure 2:
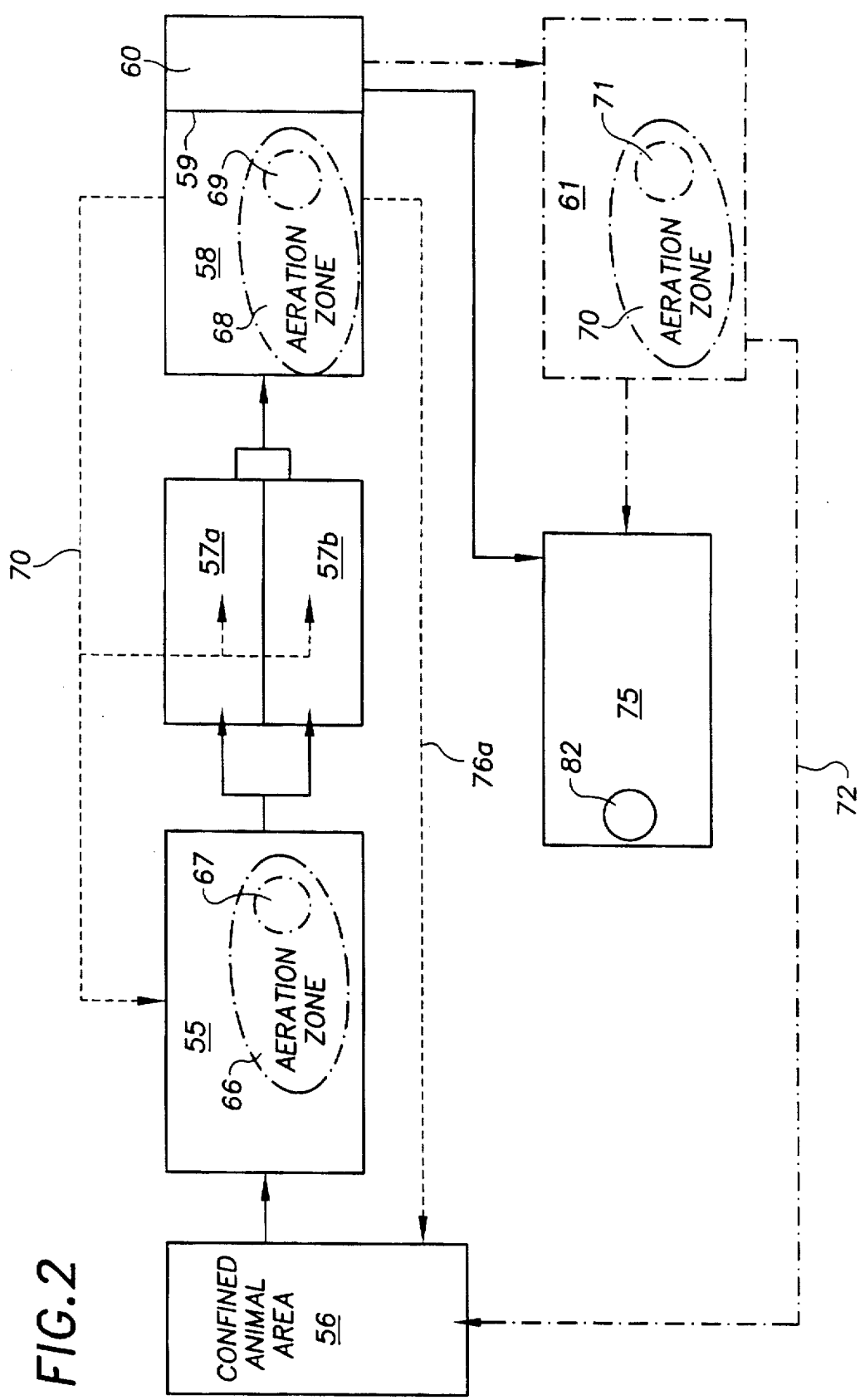
FIG. 2 comprises a flow diagram of another embodiment of the process of the invention with a primary and secondary bioreactor and a solids ecoreactor.

FIG. 2 comprises a further embodiment of the process of the invention which is particularly suitable for bioconverting particularly nutrient strong animal waste input such as hog or chicken wastes. Therein an aqueous manure influent, containing high quantities of phosphorus, nitrogen, animal cleaning fluids and the like, is introduced into a bioreactor 55 from a confined animal area 56 such as a barn, coop, penning area or the like. Bioreactor 55 is illustrated as comprising diverse anaerobic and anoxic zones, containing an engineered aerobic zone generated in part as shown in phantom at 66 as being formed about optional aerator 67. Bioreactor 55 has a primary purpose of reducing odors and increasing the size and diversity of the microbial biomass generated without significant solids settlement.

Solids ecoreactor cells 57a and 57b are illustrated as being adjacently arranged to receive influent, high in both soluble and primary insoluble nutrients and organics, from bioreactor 55 in such manner that flow may be diverted to one or another or both cell(s) to facilitate solids settlement and cyclical drying and recovery of solids within a cell. It should be understood that one or several solids ecoreactors may be in the system at this stage, having the dual purpose of capturing the primary solids loading of the system and bioconverting such primary solids loading.

Aqueous effluent, generally high in soluble nutrients and organics, from the solids ecoreactor(s) is passed to a second bioreactor 58, which comprises a settling zone 60, generally established within the bioreactor by arrangement of a baffle 59 or the like, to settle biomass and precipitable materials. As with bioreactor 55, bioreactor 58 comprises diverse anaerobic, anoxic and aerobic zones, and optionally may comprise an engineered aerobic zone as shown in phantom at 68, being formed about optional aerator 69.

Dotted lines 76 and 76a illustrate various optional recycling of facultative organisms among one or more of the solids ecoreactor(s), bioreactors 55 and/or 58 and the confined animal area 56. Generally, the recycle is of conditioned active micro-organism containing fluids from bioreactor 58 to bioreactor 55 and/or the solids ecoreactor(s) to maximize the operating efficiency of the solids ecoreactor(s) and/or bioreactor 55. It should be understood however, depending upon where fluid is taken from bioreactor 58 the fluid may be of a differing quality which may be desirably used as wash fluids or the like in the confined animal area.

Aqueous effluent from bioreactor 58 is generally of sufficient nutrient stability to be passed directly to a polishing ecoreactor and/or water storage area 75. Optionally however, generally depending upon the strength of the initial animal waste product being treated, such effluent may be passed to a further bioreactor, as depicted in phantom at 61, for further bioconversion also optionally including an engineered aerobic zone as shown in phantom at 70, being formed about optional aerator 71. Generally, the quality of the effluent from bioreactor 61 is such as to warrant recycle as shown by 72 as wash water for use in confined animal area 56.

Sump 82 is illustrated to enable for pumping low nutrient water from the polishing ecoreactor and/or storage area 75 for irrigation or application to a sprayfield or the like not shown.

The end products of the bioconversion process in the solids ecoreactor, upon air drying, generally contain 25% solids or greater containing humus material which is nutrient-rich having a variable and controllable nutrient content. The materials generated in the solids ecoreactor will contain variable and controllable chemical and biological compositions which will make them suitable and valuable for a variety of commercial and agricultural uses. The variety of nutrient compositions in the organic soils which can be produced by this process ranges from about 0.05 percent each for nitrogen, phosphorus, and potassium on a dry weight basis to greater than about 5 percent each for the same nutrients. The comminuted nature of the humus materials can be further mixed with a variety of other inorganic materials such as sand, clay, gravel, etc., to produce a wide variety of different soils useful in agricultural, landscaping, forestry and ecological applications.

A constant source of high nutrient water is generally necessary to the operation of the solids ecoreactor and a large fraction of the water that leaves the bioreactor will become part of a solids ecoreactor recycle loop. Solids ecoreactor effluent may be returned to the animal confinement area for use in a flushing system.

Nutrient rich aqueous effluent from the solids ecoreactor zone is directed to the bioreactor zone. The bioreactor zone comprises a structurally contained and physically controlled microbial growth zone. Its principle function is to attach soluble materials such as soluble phosphorous, nitrogen, potassium and toxins to living aggregates of biomass so as to further the bioconversion process through the association of the undesirable materials with microbial physiological processes.

The build-up of humus within the solids ecoreactor occurs gradually through the interaction of the many diversified microorganisms with the biomass and waste materials in the influent wastewater. The entrapped microbial biomass cellulosic materials and the like provide a growth medium and substrate for the developing biomass to produce a balanced humus material comprising complexed phosphorus and nitrogenous materials from the animal waste excrement.

Humus material generated in the solids ecoreactor from flushed manures and wastewater from cows, steers or other ruminating animals is generally characterized in being a peat-like, cellulosic material in that it comprises at least about 30% cellulosic material (dry weight basis at 105° C. for 2 hrs), which upon drying is relatively hydrophobic in that it resists wetting, but, upon wetting becomes hydrophilic in that it tends to hold water with excess water draining therethrough. The humus material generated in the solids ecoreactor from poultry, hogs and other non-ruminant animal waste may not contain a significant cellulosic fraction, but will otherwise resemble such humus materials of the invention.

The humus material generated by the process of the invention generally comprises a high level of stabilized nitrogen, phosphorus and potassium primary nutrients, wherein the total nitrogen content has less than about 3% in the form of ammonia. In addition the humus contains calcium, magnesium, iron, manganese and sulfur secondary nutrients. The humus material is noticeably devoid of the excrement odor and has the general odor of common soil. The consistency of the humus is generally closely similar to common peat and/or granular soils and can be readily mixed with soil or a variety of inorganic materials such as sand, clay, gravel, etc., to produce a nutrient containing soil useful in agricultural, landscaping, forestry, and ecological applications.

In addition to treating the solids biomass from the bioreactor, the bioreactor and/or polishing ecoreactor can provide additional treatment of materials which may be contained in an aqueous and/or gaseous phase in existing fields. Runoff water from rainfall and the like of adjacent fields containing high concentrations of phosphorus and/or nitrogen can be directed to the bioreactor and/or polishing ecoreactor zones wherein the existing biomass, together with plants, animals and especially microorganisms therein will assimilate and act upon the phosphorus and nitrogen, thereby furthering the bioconversion process. In situations requiring greater nutrient reductions, chemical addition can also be utilized in conjunction with the polishing ecoreactor.

Fluid movement within the various zones can be controlled and directed by appropriate placement and operation of various collection and distribution pumps, pipes, wells, etc. In general, it is preferred to isolate the material to be bioconverted to prevent migration into the surrounding environment, particularly when the bioreactor and/or solids ecoreactor zones are not isolated from the general ground soil. Typically the bioreactor and/or ecoreactor are easily isolated using an artificial or natural, impervious liner.

The bioreactor(s) and ecoreactor(s) can be connected in a variety or ways. Typically, the bioreactor zone receives a liquid influent stream of gravity fed or pumped fluid from the solids ecoreactor and/or flushed animal manures or other liquids such as waste water, runoff and the like. The liquid effluent of the bioreactor and any excess biological solids generated by the bioconversion activity occurring within the bioreactor is generally transferred to a solids ecoreactor zone directly or as a recycle flow, for further bioconversion using a system of weirs, pumps, channels and the like readily apparent to one of skill in the art.

The solids ecoreactor zone generally comprises two or more areas arranged for alternating use so that solids can quiescently settle and/or be removed between cycles. Generally, the solids ecoreactor zone is lined with an impermeable liner or the like and comprises an outlet therefrom which freely allows the flow of reduced solids containing fluid therefrom. The effluent from the solids ecoreactor is collected in a pumping sump and is typically recycled back to a bioreactor or to a holding tank or flush tank for use in flushing the barn, pens, etc., or may be recycled back to the influent end of the solids ecoreactor to mix with or move manure solids scraped from barns or pens or the like.

Chemical precipitant may be added in a bioreactor or to the liquid influent of an ecoreactor to maximize precipitation of phosphorus and nitrogen complexes.

The bioreactor zone(s) generally comprise a pond-like environment containing an aerating means at or near the effluent discharge end thereof. The presence of aeration tends to foster creation of an aerobic zone within the bioreactor zone through air bubbling up which allows for zones having different dissolved oxygen levels and hence favors different microbial and other organismal populations. Natural currents created through the addition of influent and the agitating action of the aerator cause movement of the influent toward the aerator and development of an active biomass.

The bioreactor zone itself ranges from one to 10 meters deep and is typically lined with an impervious liner such as plastic, clay or the like. Occasionally, provision is made for the bioreactor zone to receive high phosphorus and/or nitrogen containing influent collected from adjacent fields such as through rain run-off and the like. Solids settling in the bioreactor zone can be periodically removed and combined with the bioconverted solids from the solids ecoreactor.

Effluent from the aerobic section of a bioreactor zone may be cycled into a cell of a polishing ecoreactor zone, which is preferably located adjacent the bioreactor zone. The polishing ecoreactor zone contains maximally diversified populations of plants, animals and microorganisms, all living in an extensive variety of different sub-environments. Water depth within the polishing ecoreactor zone generally varies from over about 4 meters to less than about one centimeter.

One or more of the cells of the polishing ecoreactor zone may comprise a georeactor zone thereunder or adjacent thereto such that water is allowed to seep from the polishing ecoreactor zone through the georeactor zone to the groundwater aquifer.

The polishing ecoreactor zone is generally composed of separate but connected cells which allows a given cell to serve as a primary solids accumulator. When the cell becomes full, a second cell is converted into the primary solids accumulator and so on. The effluent from the polishing ecoreactor zone thereafter flows to a water holding area where it is typically of sufficient quality to be nonthreatening to the environment.

As an individual polishing ecoreactor cell becomes mature, its organismal population also goes through a natural evolution. The materials which are initially deposited are subjected to a series of actions by other organisms. Plant growth becomes more extensive and animal populations emerge which act on the steadily accumulating organic plant material. All of this results in gradual bioconversion of the material comprising the polishing ecoreactor into an organic humus material which is also of commercial value.

After a suitable period of time, usually from three months to a year or more, a solids ecoreactor cell may be disconnected from the hydraulic flow pattern of the solids ecoreactor zone. The cell is allowed to dry, through natural evaporation, wherein the material therein undergoes a curing phenomena. As aqueous fluid of the cell evaporates, the microbial activity within the cell continues in an enhanced aerated environment. This change in environment appears to promote an increase in decay of fibrous material comprised in the cell curing the material to a generally comminuted humus form which is collected for its value as a fertilizer, soil enhancer, plant growth medium or the like.

I claim:

1. A humus material, comprising, on a dry weight basis, from about 0.1% to about 2.0% stabilized phosphorus, from about 0.1% to about 2.0% stabilized potassium, from about 0.2% to about 6.0% stabilized nitrogen comprising less than about 3% of ammonia in total nitrogen content, bound in an active micro-organism matrix, which has been formed by treating unstabilized phosphorus, potassium and nitrogen containing animal waste in anaerobic and aerobic environments to form facultative organisms predisposed to proactively adapt and interact with additive materials.

2. A humus of claim 1 mixed with at least one of clay, sand, silt, mud, soil, gravel, dust, mine tailings and dredgings.

3. A humus of claim 2 wherein said soil is a nutrient depleted soil.

4. A humus of claim 2 wherein said soil is a topsoil.

5. A humus of claim 1 mixed with at least one of sawdust, paper, cardboard, polymer, plastic or waste organic selected from bagasse, hulls, stalks, stems, waste hay, leaves, shells, cotton and rayon dust.

6. A humus of claim 1 comprising an active micro organic matrix adapted to capture toxic and radioactive substances.

7. A humus of claim 1 comprising an active organic matrix adapted to degrade at least one of cellulose, lignin or plastic.

8. A humus of claim 1 comprising an active organic matrix adapted to promote seed germination.

9. A humus of claim 1 comprising an active organic matrix adapted to increase crop yield.

10. A humus of claim 1 comprising an active organic matrix adapted to deliver animal food nutrients.

11. An animal food comprising a humus of claim 1.

12. A feedstock component comprising a humus of claim 1.

13. A humus of claim 1 arranged in a flooded environment enabled to supply nutrients to an aqueous plant growth system.

14. The arrangement of claim 13 enabled to supply nutrients to a hydroponic plant growth system.

* * * * *